United States Patent
Tan et al.

(10) Patent No.: US 10,003,579 B2
(45) Date of Patent: Jun. 19, 2018

(54) METHOD FOR MAKING FRIENDS ANONYMOUSLY UNDER INSTANT MESSAGING COMMUNICATIONS IN ORDER TO PROTECT A REAL PERSONAL IDENTITY

(71) Applicant: Gemtek Technology Co., Ltd., Hsinchu (TW)

(72) Inventors: Der-Hwa Tan, Hsinchu (TW); Hsi-Chuan Wei, Hsinchu (TW); Chia-Yuan Hsu, Hsinchu (TW)

(73) Assignee: Gemtek Technology Co., Ltd., Hsinchu (TW)

( * ) Notice: Subject to any disclaimer, the term of this patent is extended or adjusted under 35 U.S.C. 154(b) by 0 days. days.

(21) Appl. No.: 15/434,028

(22) Filed: Feb. 15, 2017

(65) Prior Publication Data

US 2018/0139185 A1 May 17, 2018

(30) Foreign Application Priority Data

Nov. 14, 2016 (TW) .............................. 105137039 A

(51) Int. Cl.
*H04L 29/06* (2006.01)
*H04L 29/08* (2006.01)
*H04L 29/12* (2006.01)
*H04L 12/58* (2006.01)

(52) U.S. Cl.
CPC .......... *H04L 63/0421* (2013.01); *H04L 51/04* (2013.01); *H04L 61/1594* (2013.01); *H04L 61/3065* (2013.01); *H04L 67/306* (2013.01)

(58) Field of Classification Search
CPC . H04L 63/0421; H04L 51/04; H04L 61/3065; H04L 67/306; H04L 61/1594
See application file for complete search history.

(56) References Cited

U.S. PATENT DOCUMENTS

| | | | |
|---|---|---|---|
| 2004/0192299 A1* | 9/2004 | Wilson | H04W 64/00 455/433 |
| 2014/0082088 A1* | 3/2014 | Ye | H04L 63/102 709/204 |
| 2014/0129628 A1* | 5/2014 | Fletcher | H04W 12/02 709/204 |
| 2014/0269657 A1* | 9/2014 | Kim | H04W 8/005 370/338 |
| 2015/0067055 A1* | 3/2015 | Khera | H04L 63/0407 709/204 |

* cited by examiner

*Primary Examiner* — Meng Li
(74) *Attorney, Agent, or Firm* — Winston Hsu

(57) ABSTRACT

After a friendship pairing process is executed according to a phone directory, send a friendship request message, create at least one first platform identity by the first user, and the first user uses a first platform identity of the at least one first platform identity to make friends with the second user having a platform identity. The first user does not have any platform identity before the first user creates the at least one first platform identity.

7 Claims, 7 Drawing Sheets

METHOD FOR MAKING FRIENDS ANONYMOUSLY UNDER INSTANT MESSAGING COMMUNICATIONS IN ORDER TO PROTECT A REAL PERSONAL IDENTITY

BACKGROUND OF THE INVENTION

1. Field of the Invention

The present invention illustrates a method for making friends anonymously, and more particularly, a method for making friends anonymously under instant messaging communications in order to protect a real personal identity.

2. Description of the Prior Art

With advancement of network technology, instant messaging communications are popularly adopted in our daily life. An instant message system is a real-time communication system through a wireless or wired network. Specifically, the instant message system provides data transmission among several user terminals, such as text data communications, video data communications, and/or audio data communications. The instant message system can be integrated with a website, software, or a mobile application program for providing various association services. For example, a chat room of Facebook or a chat room of Line can provide an instant messaging function. By using the instant messaging function, point-to-point based data transmission can be achieved between two user terminals. Also, broadcast based data transmission can be achieved among a set of user terminals.

In the conventional instant message system, a single account is bounded to a user. Particularly, the single account requires a real personal identity of the user. For example, when a user wants to enter the chat room of Facebook, the user has to login a Facebook account first. When the user creates the Facebook account, a Facebook server sends a request to the user for entering a telephone number. After the telephone number is acquired by the Facebook server, the Facebook server sends a verification code through a short message. Then, the user has to enter the verification code and activate the Facebook account by using an email address of the user. Thus, when the user successfully creates the Facebook account, all real personal data may be bounded with the Facebook account. Thus, when the user wants to make friends with other users, the user has to send a friendship massage with real personal data to the other users. Then, the user has to wait responses from other users. In other words, when a user receives the friendship massage, the user can respond to the friendship massage by using a single account (i.e., for example, acceptance or rejection). As a result, since the user uses only one account to receive, accept, or reject the friendship massage, society of the user may be unexpectedly disturbed. Further, as previously mentioned, since the instant message system requires to bound the real personal data of the user, when the user uses networking services to make friends with other users, risks of unauthorized account usage and user data leakage (i.e., real personal data) may be increased.

SUMMARY OF THE INVENTION

In an embodiment of the present invention, a method for making friends anonymously is disclosed. The method comprises executing a friendship pairing process according to a phone directory, sending a friendship request message, creating at least one first platform identity by a first user, the first user using a first platform identity selected from the at least one first platform identity to make friends with a second user having a platform identity. The first user does not have any platform identity before the first user creates the at least one first platform identity.

In another embodiment of the present invention, a method for making friends anonymously is disclosed. The method comprises executing a friendship pairing process according to a phone directory, sending a friendship request message, creating at least one additional first platform identity by a first user, and the first user using a first designated platform identity selected from the at least one additional first platform identity to make friends with a second designated platform identity selected by a second user.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
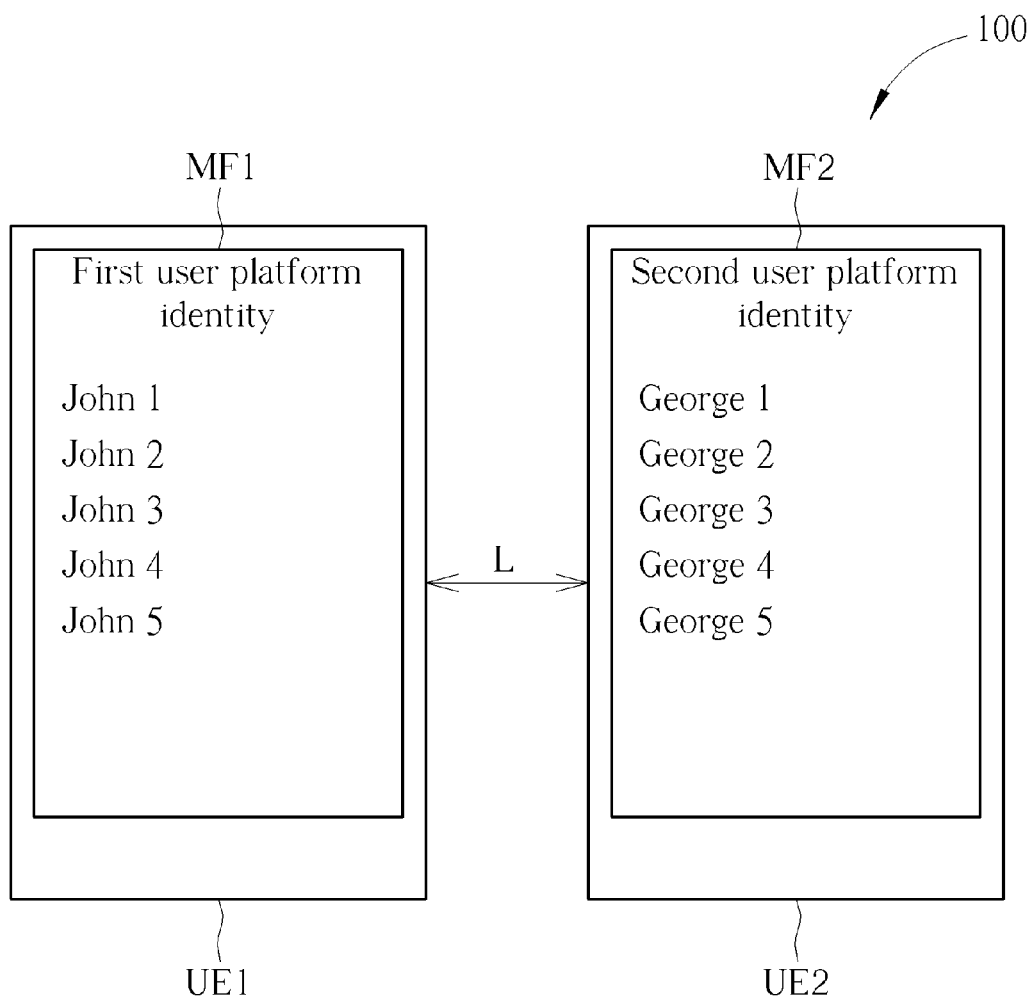
FIG. 1 is an illustration of a system capable of making friends anonymously according to the embodiment of the present invention.

FIG. 1 is an illustration of a system 100 capable of making friends anonymously according to the embodiment of the present invention. The system 100 includes a first user equipment UE1 and a second user equipment UE2. In the system 100, the first user equipment UE1 and the second user equipment UE2 can be any devices capable of performing communications, such as tablets, smart phones, personal computers, or notebooks. The first user equipment UE1 and the second user equipment UE2 perform data transmission through a link L. The link L can be any wired or wireless data link. For example, the link L can be a mobile communications link, a Wi-Fi link, a Bluetooth link, or a cable link. The first user equipment UE1 can include an interface MF1. The second user equipment UE2 can include an interface MF2. The interface MF1 and the interface MF2 can include various messages. For example, the interface MF1 includes a personal identity message of a first user, a friendship notification message of the first user, and/or a contact person message of the first user. Specifically, the interface MF1 can be displayed on a touch screen of the first user equipment UE1. Thus, the first user can execute various functions for making friends through the interface MF1. Similarly, the interface MF2 can include a personal identity message of a second user, a friendship notification message of the second user, and/or a contact person message of the second user.

Specifically, the interface MF2 can be displayed on a touch screen of the second user equipment UE2. Thus, the second user can execute various functions for making friends through the interface MF2. In the system 100, the first user equipment UE1 and the second user equipment UE2 can perform various functions for making friends by using application programs. However, the present invention is not limited to use application programs for making friends. Any software, hardware, or cloud system used in the system 100 for making friends falls into a scope of the present invention. For simplicity, the system 100 uses the application programs for making friends. In the system 100, the first user can be a user without any platform identity. Particularly, a definition of the user without any platform identity is that a user does not have any account of a social network platform established by the application programs. The first user can also be a user having a single platform identity. Particularly, a definition of the user having a single platform identity is that a user has only one account of a social network platform established by the application programs. The first user can also be a user having a plurality of identities. Particularly, a definition of the user having the plurality of identities is that a user has many accounts of a social network platform established by the application programs. Similarly, the second user can be a user without any platform identity, a user having a single platform identity, or a user having a plurality of identities. In FIG. 1, for example, the first user and the second user are two users both having a plurality of identities. The interface MF1 can display five identities of the first user, such as John1, John2, John3, John4, and John5. The interface MF2 can display four identities of the second user, such as George1, George2, George3, and George4. In order to protect real personal identity of the user (i.e., real name of the user or real personal information of the user), the first user and the second user can create at least one virtual platform identity by following instructions of the system 100 for making friends. By doing so, the real personal identity of the first user or the second user can be hidden.

As previously mentioned, the first user can be a user without any platform identity, a user having a single platform identity, or a user having a plurality of identities. For avoiding ambiguity, the first user without any platform identity is denoted as "A1". The first user having a single platform identity is denoted as "B1". The first user having a plurality of identities is denoted as "C1". The second user without any platform identity is denoted as "A2". The second user having a single platform identity is denoted as "B2". The second user having a plurality of identities is denoted as "C2". In other words, nine combinations for making friends between the first user and the second user are introduced, as illustrated below.

In a first mode for making friends, the first user A1 does not have any platform identity. The second user A2 does not have any platform identity. When the second user A2 is listed in a phone directory of the first user A1, a friendship request message can be sent to the second user A2 automatically by the system 100 according to a friend list of the phone directory of the first user A1. However, the present invention is not limited to using a phone directory for pairing friends. For example, the friendship request message can be sent automatically according to a corporate directory, a friend list of social network, a friend list of fans club, a friend list of big data server, or a penpal list generated by a location-based server. For simplicity, the phone directory is introduced to the present invention. Here, since the first user A1 and the second user A2 both have no platform identity, when the first user A1 and the second user A2 enter the system 100, the system 100 generates a notification message for preparing to make friends between the first user A1 and the second user A2. Further, the system 100 can recommend the first user A1 and the second user A2 to create their platform identities. For example, when the first user A1 and the second user A2 enter the system 100, the second user A2 receives a friendship request message from the first user A1. When the first user A1 is not listed in the phone directory of the second user A2, the friendship request message including a telephone number of the first user A1 is displayed on the interface MF2 for indicating an identity of the first user A1. When the first user A1 is listed in the phone directory of the second user A2, the friendship request message including a nickname of the first user A1 (i.e., listed in the phone directory) is displayed on the interface MF2 for indicating an identity of the first user A1, and vice versa. In the following, a message for preparing to make friends is notified to the first user A1 and the second user A2. Then, the system 100 recommends the first user A1 to create at least one first platform identity. The system 100 also recommends the second user A2 to create at least one second platform identity. In other words, the system 100 recommends the first user A1 to become (or say, upgrade to) a first user B1 having a single platform identity or a first user C1 having a plurality of identities. Also, the system 100 recommends the second user A2 to become (or say, upgrade to) a second user B2 having a single platform identity or a second user C2 having a plurality of identities. Then, the first user A1 and/or the second user A2 can proceed with the friendship process by selecting "agreement" function. The first user A1 and/or the second user A2 can also terminate the friendship process by selecting "rejection" function. When both the first user A1 and the second user A2 agree to proceed with the friendship process, the first user A1 can upgrade an identity status to the first user B1 or the first user C1 according to instructions of the system 100. Similarly, the second user A2 can upgrade an identity status to the second user B2 or the second user C2 according to instructions of the system 100. By doing so, the first user B1 or C1 (i.e., upgraded from the first user A1) can use a first platform identity selected from the at least one first platform identity for making friends. Similarly, the second user B2 or C2 (i.e., upgraded from the second user A2) can use a second platform identity selected from the at least one second platform identity for making friends. Thus, real personal information of the first user A1 and the second user A2 can be protected.

In a second mode for making friends, the first user A1 does not have any platform identity. The second user B2 has a single platform. identity (say, "a second platform identity" hereafter). When the first user A1 and the second user B2 enter the system 100, the system 100 generates a notification message for preparing to make friends between the first user A1 and the second user B2. For example, when the first user A1 and the second user B2 enter the system 100, the second user B2 receives a friendship request message from the first user A1. When the first user A1 is not listed in the phone directory of the second user B2, the friendship request message including a telephone number of the first user A1 is displayed on the interface MF2 for indicating an identity of the first user A1. When the first user A1 is listed in the phone directory of the second user B2, the friendship request message including a nickname of the first user A1 (i.e., listed in the phone directory) is displayed on the interface MF2 for indicating an identity of the first user A1, and vice versa. In the following, a message for preparing to make friends is notified to the first user A1 and the second user B2. Then, the second user B2 can proceed with a friendship process by selecting "agreement" function. The second user B2 can also terminate the friendship process by selecting "rejection" function. When the second user B2 agrees to proceed with the friendship process, the second user B2 can use an anonymous mode or a non-anonymous mode for making friends with the first user A1. When the second user B2 uses the anonymous mode for making friends, the system 100 recommends the second user B2 to create at least one additional second platform identity. In other words, the second user B2 can upgrade an identity status to the second user C2 according to instructions of the system 100. Then, the second user C2 (upgraded from the second user B2) can use a second designated platform identity selected from the at least one additional second platform identity for responding to the friendship request message sent from the first user A1. When the second user B2 uses the non-anonymous mode for making friends, the second user B2 can use the second platform identity (i.e., a unique platform identity of the second user B2) to respond to the friendship request message sent from the first user A1. After the first user A1 receives the response from the second user B2, the system 100 recommends the first user A1 to create at least one first platform identity. In other words, the system 100 recommends the first user A1 to become (or say, upgrade to) a first user B1 having a single platform identity or a first user C1 having a plurality of identities. Then, the first user A1 can proceed with the friendship process by selecting "agreement" function. The first user A1 can also terminate the friendship process by selecting "rejection" function. When the first user A1 agrees to proceed with the friendship process, the first user A1 can upgrade an identity status to the first user B1 or the first user C1 according to instructions of the system 100. By doing so, the first user B1 or C1 (i.e., upgraded from the first user A1) can use a first platform identity selected from the at least one first platform identity for making friends. Thus, real personal information of the first user A1 and the second user B2 can be protected.

In a third mode for making friends, the first user A1 does not have any platform identity. The second user C2 has a plurality of identities. Similarly, when the first user A1 and the second user C2 enter the system 100, the system 100 generates a notification message for preparing to make friends between the first user A1 and the second user C2. Further, the system 100 can recommend the first user A1 to create at least one platform identity. For example, when the first user A1 and the second user C2 enter the system 100, the second user C2 receives a friendship request message from the first user A1. When the first user A1 is not listed in the phone directory of the second user C2, the friendship request message including a telephone number of the first user A1 is displayed on the interface MF2 for indicating an identity of the first user A1. When the first user A1 is listed in the phone directory of the second user C2, the friendship request message including a nickname of the first user A1 (i.e., listed in the phone directory) is displayed on the interface MF2 for indicating an identity of the first user A1, and vice versa. In the following, a message for preparing to make friends is notified to the first user A1 and the second user C2. Then, the second user C2 can proceed with a friendship process by selecting "agreement" function. The second user C2 can also terminate the friendship process by selecting "rejection" function. After the second user C2 agrees to proceed with the friendship process, a second platform identity can be selected from the plurality of identities by the second user C2 for responding to the friendship request message sent from the first user A1. After the first user A1 receives the response from the second user C2, the system 100 recommends the first user A1 to create at least one first platform identity. In other words, the system 100 recommends the first user A1 to become (or say, upgrade to) a first user B1 having a single platform identity or a first user C1 having a plurality of identities. Then, the first user A1 can proceed with the friendship process by selecting "agreement" function. The first user A1 can also terminate the friendship process by selecting "rejection" function. When the first user A1 agrees to proceed with the friendship process, the first user A1 can upgrade an identity status to the first user B1 or the first user C1 according to instructions of the system 100. By doing so, the first user B1 or C1 (i.e., upgraded from the first user A1) can use a first platform identity selected from the at least one first platform identity for making friends. Thus, real personal information of the first user A1 and the second user C2 can be protected.

In a fourth mode for making friends, the first user B1 has a single platform identity (say, "a first platform identity" hereafter). The second user A2 does not have any platform identity. Specifically, the fourth mode corresponds to the second mode. The roles of the first user A1 and the second user B2 in the second mode are interchanged. When the first user B1 and the second user A2 enter the system 100, the system 100 generates a notification message for preparing to make friends between the first user B1 and the second user A2. For example, when the first user B1 and the second user A2 enter the system 100, the second user A2 receives a friendship request message from the first user B1. When the first user B1 is not listed in the phone directory of the second user A2, the friendship request message including a telephone number of the first user B1 is displayed on the interface MF2 for indicating an identity of the first user B1. When the first user B1 is listed in the phone directory of the second user A2, the friendship request message including a nickname of the first user B1 (i.e., listed in the phone directory) is displayed on the interface MF2 for indicating an identity of the first user B1, and vice versa. In the following, a message for preparing to make friends is notified to the first user B1 and the second user A2. Then, the second user A2 can proceed with a friendship process by selecting "agreement" function. The second user A2 can also terminate the friendship process by selecting "rejection" function. When the second user A2 agrees to proceed with the friendship process, the system 100 recommends the second user A2 to create at least one second platform identity. In other words, the system 100 recommends the second user A2 to become (or say, upgrade to) a second user B2 having a single platform identity or a second user C2 having a plurality of identities. Thus, the second user A2 can upgrade an identity status to the second user B2 or the second user C2 according to instructions of the system 100. By doing so, the second user B2 or C2 (i.e., upgraded from the second user A2) can use a second platform identity selected from the at least one second platform identity for making friends. After the first user B1 receives a response from the second user A2 (i.e., the second user A2 may be upgraded to the second user B2 or C2), the first user B1 can proceed with a friendship process by selecting "agreement" function. The first user B1 can also terminate the friendship process by selecting "rejection" function. When the first user B1 agrees to proceed with the friendship process, the first user B1 can use an anonymous mode or a non-anonymous mode for making friends with the second user A2. When the first user B1 uses the anonymous mode for making friends, the system 100 recommends the first user B1 to create at least one additional first platform identity. In other words, the first user B1 can upgrade an identity status to the first user C1 according to instructions of the system 100. Then, the first user C1 (upgraded from the first user B1) can use a first designated platform identity selected from the at least one additional first platform identity for responding to the friendship request message sent from the second user A2. When the first user B1 uses the non-anonymous mode for making friends, the first user B1 uses the first platform identity (i.e., a unique platform identity of the first user B1) for responding to the friendship request message sent from the second user A2. Thus, real personal information of the first user B1 and the second user A2 can be protected.

In a fifth mode for making friends, the first user B1 has a single platform identity (say, "a first platform identity" hereafter). The second user B2 has a single platform identity (say, "a second platform identity" hereafter). When the first user B1 and the second user B2 enter the system 100, the system 100 generates a notification message for preparing to make friends between the first user B1 and the second user B2. The system 100 can recommend both the first user B1 and the second user B2 to create their additional platform identity. For example, when the first user B1 and the second user B2 enter the system 100, the second user B2 receives a friendship request message from the first user B1. When the first user B1 is not listed in the phone directory of the second user B2, the friendship request message including a telephone number of the first user B1 is displayed on the interface MF2 for indicating an identity of the first user B1. When the first user B1 is listed in the phone directory of the second user B2, the friendship request message including a nickname of the first user B1 (i.e., listed in the phone directory) is displayed on the interface MF2 for indicating an identity of the first user B1, and vice versa. In the following, a message for preparing to make friends is notified to the first user B1 and the second user B2. Then, the second user B2 can proceed with a friendship process by selecting "agreement" function. The second user B2 can also terminate the friendship process by selecting "rejection" function. When the second user B2 agrees to proceed with the friendship process, the second user B2 can use an anonymous mode or a non-anonymous mode for making friends with the first user B1. When the second user B2 uses the anonymous mode for making friends, the system 100 recommends the second user B2 to create at least one additional second platform identity. In other words, the second user B2 can upgrade an identity status to the second user C2 according to instructions of the system 100. Then, the second user C2 (upgraded from the second user B2) can use a second designated platform identity selected from the at least one additional second platform identity for responding to the friendship request message sent from the first user B1. When the second user B2 uses the non-anonymous mode for making friends, the second user B2 uses the second platform identity (i.e., a unique platform identity of the second user B2) for responding to the friendship request message sent from the first user B1. After the first user B1 receives the response from the second user B2, the first user B1 can proceed with a friendship process by selecting "agreement" function. The first user B1 can also terminate the friendship process by selecting "rejection" function. When the first user B1 agrees to proceed with the friendship process, the first user B1 can use an anonymous mode or a non-anonymous mode for making friends with the second user B2. When the first user B1 uses the anonymous mode for making friends, the system 100 recommends the first user B1 to create at least one additional first platform identity. In other words, the first user B1 can upgrade an identity status to the first user C1 according to instructions of the system 100. Then, the first user C1 (upgraded from the first user B1) can use a first designated platform identity selected from the at least one additional first platform identity for responding to the friendship request message sent from the second user B2. When the first user B1 uses the non-anonymous mode for making friends, the first user B1 uses the first platform identity (i.e., a unique platform identity of the first user B1) for responding to the friendship request message sent from the second user B2. Thus, real personal information of the first user B1 and the second user B2 can be protected.

In a sixth mode for making friends, the first user B1 has a single platform identity (say, "a first platform identity" hereafter). The second user C2 has a plurality of identities. Similarly, when the first user B1 and the second user C2 enter the system 100, the system 100 generates a notification message for preparing to make friends between the first user B1 and the second user C2. Further, the system 100 can recommend the first user B1 to create at least one additional first platform identity. For example, when the first user B1 and the second user C2 enter the system 100, the second user C2 receives a friendship request message from the first user B1. When the first user B1 is not listed in the phone directory of the second user C2, the friendship request message including a telephone number of the first user B1 is displayed on the interface MF2 for indicating an identity of the first user B1. When the first user B1 is listed in the phone directory of the second user C2, the friendship request message including a nickname of the first user B1 (i.e., listed in the phone directory) is displayed on the interface MF2 for indicating an identity of the first user B1, and vice versa. In the following, a message for preparing to make friends is notified to the first user B1 and the second user C2. Then, the second user C2 can proceed with a friendship process by selecting "agreement" function. The second user C2 can also terminate the friendship process by selecting "rejection" function. After the second user C2 agrees to proceed with the friendship process, a second platform identity can be selected from the plurality of identities by the second user C2 for responding to the friendship request message sent from the first user B1. After the first user B1 receives the response from the second user C2, the first user B1 can proceed with a friendship process by selecting "agreement" function. The first user B1 can also terminate the friendship process by selecting "rejection" function. When the first user B1 agrees to proceed with the friendship process, the first user B1 can use an anonymous mode or a non-anonymous mode for making friends with the second user C2. When the first user B1 uses the anonymous mode for making friends, the system 100 recommends the first user B1 to create at least one additional first platform identity. In other words, the first user B1 can upgrade an identity status to the first user C1 according to instructions of the system 100. Then, the first user C1 (upgraded from the first user B1) can use a first designated platform identity selected from the at least one additional first platform identity for responding to the friendship request message sent from the second user C2. When the first user B1 uses the non-anonymous mode for making friends, the first user B1 uses the first platform identity (i.e., a unique platform identity of the first user B1) for responding to the friendship request message sent from the second user C2. Thus, real personal information of the first user B1 and the second user C2 can be protected.

In a seventh mode for making friends, the first user C1 has a plurality of identities. The second user A2 does not have any platform identity. Specifically, the seventh mode corresponds to the third mode. The roles of the first user A1 and the second user C2 in the third mode are interchanged. When the first user C1 and the second user A2 enter the system 100, the system 100 generates a notification message for preparing to make friends between the first user C1 and the second user A2. Further, the system 100 can recommend the second user A2 to create at least one platform identity. For example, when the first user C1 and the second user A2 enter the system 100, the second user A2 receives a friendship request message from the first user C1. When the first user C1 is not listed in the phone directory of the second user A2, the friendship request message including a telephone number of the first user C1 is displayed on the interface MF2 for indicating an identity of the first user C1. When the first user C1 is listed in the phone directory of the second user A2, the friendship request message including a nickname of the first user C1 (i.e., listed in the phone directory) is displayed on the interface MF2 for indicating an identity of the first user C1, and vice versa. In the following, a message for preparing to make friends is notified to the first user C1 and the second user A2. Then, the second user A2 can proceed with a friendship process by selecting "agreement" function. The second user A2 can also terminate the friendship process by selecting "rejection" function. When the second user A2 agrees to proceed with the friendship process, the system 100 recommends the second user A2 to create at least one second platform identity. In other words, the system 100 recommends the second user A2 to become (or say, upgrade to) a second user B2 having a single platform identity or a second user C2 having a plurality of identities. Thus, the second user A2 can upgrade an identity status to the second user B2 or the second user C2 according to instructions of the system 100. By doing so, the second user B2 or C2 (i.e., upgraded from the second user A2) can use a second platform identity selected from the at least one second platform identity for making friends. After the first user C1 receives a response from the second user A2 (i.e., the second user A2 may be upgraded to the second user B2 or C2), the first user C1 can proceed with a friendship process by selecting "agreement" function. The first user C1 can also terminate the friendship process by selecting "rejection" function. After the first user C1 agrees to proceed with the friendship process, a first platform identity can be selected from the plurality of identities by the first user C1 for responding to the friendship request message sent from the second user A2. Thus, real personal information of the first user C1 and the second user A2 can be protected.

In an eighth mode for making friends, the first user C1 has a plurality of identities. The second user B2 has a single platform identity (say, "a second platform identity" hereafter). Specifically, the eighth mode corresponds to the sixth mode. The roles of the first user B1 and the second user C2 in the second mode are interchanged. When the first user C1 and the second user B2 enter the system 100, the system 100 generates a notification message for preparing to make friends between the first user C1 and the second user B2. Further, the system 100 can recommend the second user B2 to create at least one additional second platform identity. For example, when the first user C1 and the second user B2 enter the system 100, the second user B2 receives a friendship request message from the first user C1. When the first user C1 is not listed in the phone directory of the second user B2, the friendship request message including a telephone number of the first user C1 is displayed on the interface MF2 for indicating an identity of the first user C1. When the first user C1 is listed in the phone directory of the second user B2, the friendship request message including a nickname of the first user C1 (i.e., listed in the phone directory) is displayed on the interface MF2 for indicating an identity of the first user C1, and vice versa. In the following, a message for preparing to make friends is notified to the first user C1 and the second user B2. Then, the second user B2 can proceed with a friendship process by selecting "agreement" function. The second user B2 can also terminate the friendship process by selecting "rejection" function. When the second user B2 agrees to proceed with the friendship process, the second user B2 can use an anonymous mode or a non-anonymous mode for making friends with the first user C1. When the second user B2 uses the anonymous mode for making friends, the system 100 recommends the second user B2 to create at least one additional second platform identity. In other words, the second user B2 can upgrade an identity status to the second user C2 according to instructions of the system 100. Then, the second user C2 (upgraded from the second user B2) can use a second designated platform identity selected from the at least one additional second platform identity for making response of the friendship request message to the first user C1. When the second user B2 uses the non-anonymous mode for making friends, the second user B2 uses the second platform identity (i.e., a unique platform identity of the second user B2) for responding to the friendship request message sent from the first user C1. After the first user C1 receives the response from the second user B2, the first user C1 can proceed with a friendship process by selecting "agreement" function. The first user C1 can also terminate the friendship process by selecting "rejection" function. After the first user C1 agrees to proceed with the friendship process, a first platform identity can be selected from the plurality of identities by the first user C1 for responding to the friendship request message sent from the second user B2. Thus, real personal information of the first user C1 and the second user B2 can be protected.

In a ninth mode for making friends, the first user C1 has a plurality of identities. The second user C2 has a plurality of identities. When the first user C1 and the second user C2 enter the system 100, the second user C2 receives a friendship message from the first user C1. When the first user C1 is not listed in the phone directory of the second user C2, the friendship request message including a telephone number of the first user C1 is displayed on the interface MF2 for indicating an identity of the first user C1. When the first user C1 is listed in the phone directory of the second user C2, the friendship request message including a nickname of the first user C1 (i.e., listed in the phone directory) is displayed on the interface MF2 for indicating an identity of the first user C1, and vice versa. In the following, a message for preparing to make friends is notified to the first user C1 and the second user C2. Then, the second user C2 can proceed with a friendship process by selecting "agreement" function. The second user C2 can also terminate the friendship process by selecting "rejection" function. After the second user C2 agrees to proceed with the friendship process, a second platform identity can be selected from the plurality of identities by the second user C2 for responding to the friendship request message sent from the first user C1. After the first user C1 receives the response from the second user C2, the first user C1 can proceed with a friendship process by selecting "agreement" function. The first user C1 can also terminate the friendship process by selecting "rejection" function. After the first user C1 agrees to proceed with the friendship process, a first platform identity can be selected from the plurality of identities by the first user C1 for responding to the friendship request message sent from the second user C2. Thus, real personal information of the first user C1 and the second user C2 can be protected.

As previously mentioned nine modes, the system 100 can confirm intentions for making friends between the first user and the second user. Once a user selects "rejection" function, the friendship process is terminated. In other words, a condition for successfully making friends between the first user and the second user is that both the first user and the second user agree to proceed with the friendship process. The nine modes for making friends can be listed as Table A. In Table A, "A1→A2" is denoted as the first user A1 making friends with the second user A2. "A1→B2" is denoted as the first user A1 making friends with the second user B2. "A1→C2" is denoted as the first user A1 making friends with the second user C2. "B1→A2" is denoted as the first user B1 making friends with the second user A2. "B1→B2" is denoted as the first user B1 making friends with the second user B2. "B1→C2" is denoted as the first user B1 making friends with the second user C2. "C1→A2" is denoted as the first user C1 making friends with the second user A2. "C1→B2" is denoted as the first user C1 making friends with the second user B2. "C1→C2" is denoted as the first user C1 making friends with the second user C2. Table A can be written as below.

TABLE A

|  | the second user A2 | the second user B2 | the second user C2 |
| --- | --- | --- | --- |
| the first user A1 | A1→A2 (first mode) | A1→B2 (second mode) | A1→C2 (third mode) |
| the first user B1 | B1→A2 (fourth mode) | B1→B2 (fifth mode) | B1→C2 (sixth mode) |
| the first user C1 | C1→A2 (seventh mode) | C1→B2 (eighth mode) | C1→C2 (ninth mode) |

The aforementioned nine modes for making friends can include a pairing process and an invitation process. As previously mentioned, the pairing process can be performed by automatically sending the friendship request message according to a corporate directory, a friend list of social network, a friend list of fans club, a friend list of big data server, or a penpal list generated by a location-based server. The invitation process including "agreement" function and "rejection" function is illustrated in aforementioned embodiments. However, the present invention is not limited to use automatic mechanism for sending the friendship request message. For example, the pairing process can be performed manually. The friendship request message can also be sent manually. For example, when the second user C2 enables a "searchable authorization", the first user B1 may use the pairing process for finding the second user C2 manually. For the first user B1, information of the second user C2 being searched is acquired by the first user B1. The first user B1 cannot acquire any real personal information of the second user C2. Further, when the first user B1 wants to make friends with the second user C2, the first user B1 can send the friendship request message to the second user C2 manually for proceeding with the process (i.e., the sixth mode).

Flowcharts of the nine modes for making friends are illustrated. However, as previously mentioned in Table A, the second mode corresponds to the fourth mode. The third mode corresponds to the seventh mode. The sixth mode corresponds to the eighth mode. Thus, flow charts of the first mode, the second mode, the third mode, the fifth mode, the sixth mode, and the ninth mode are presented in the flowing literature for simplicity. Flow charts of the fourth mode, the seventh mode, and the eighth mode are omitted here. Particularly, step sequences of the flow charts can be reasonably exchanged. For example, a step of creating a platform identity by the first user and a step of a creating platform identity by the second user can be exchanged. A step of responding to the friendship request message by the first user and a step of responding to the friendship request message by the second user can also be exchanged.

Figure 2:
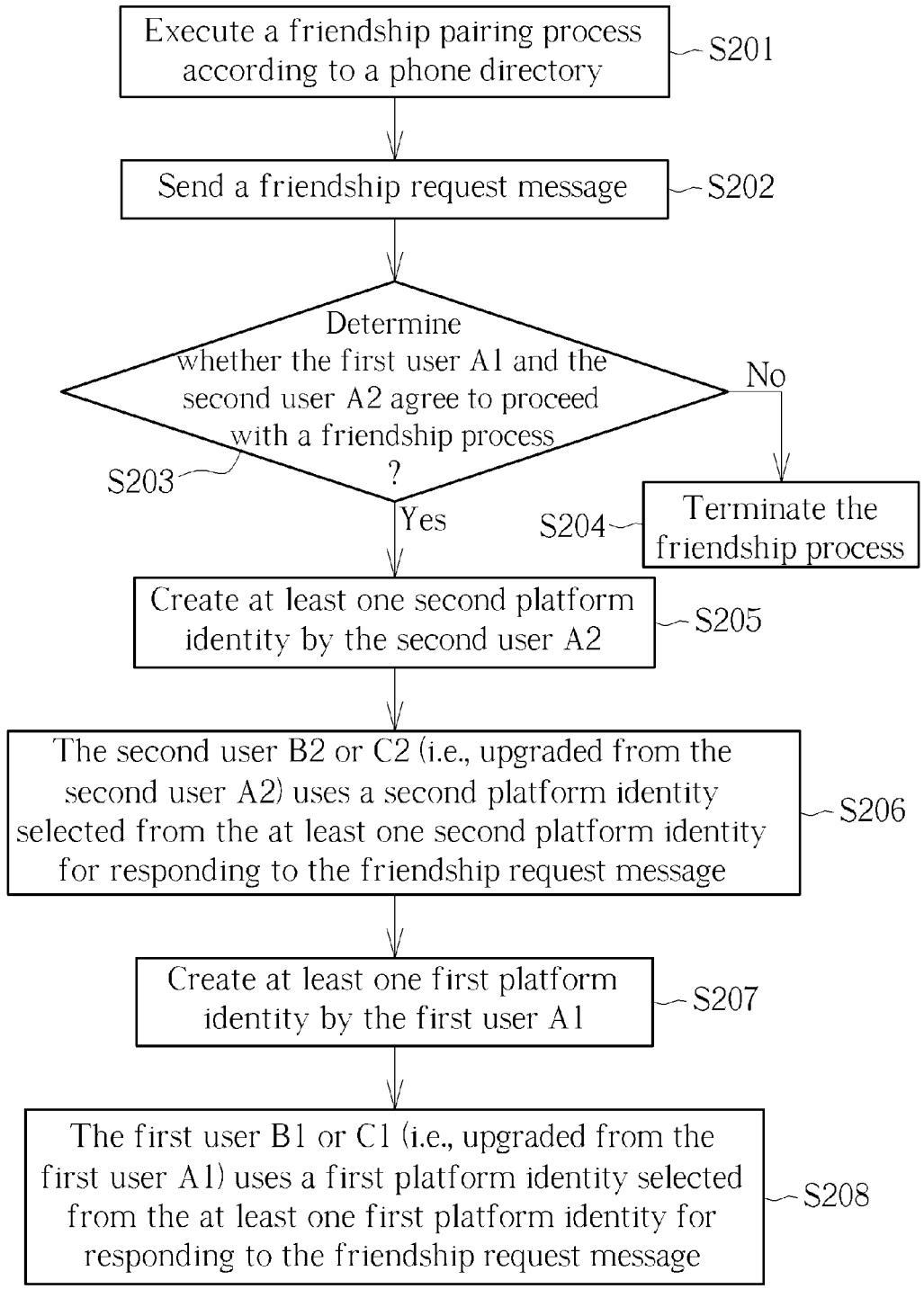
FIG. 2 is flow chart of a first mode for making friends by using the system in FIG. 1.

FIG. 2 is flow chart of a first mode for making friends by using the system 100. The first mode for making friends includes step S201 to step S208, as written below.

step S201: execute a friendship pairing process according to a phone directory;

step S202: send a friendship request message;

step S203: if the first user A1 and the second user A2 agree to proceed with a friendship process, go to step S205, else go to step S204;

step S204: terminate the friendship process.

step S205: create at least one second platform identity by the second user A2;

step S206: the second user B2 or C2 (i.e., upgraded from the second user A2) uses a second platform identity selected from the at least one second platform identity for responding to the friendship request message;

step S207: create at least one first platform identity by the first user A1;

step S208: the first user B1 or C1 (i.e., upgraded from the first user A1) uses a first platform identity selected from the at least one first platform identity for responding to the friendship request message.

The detail illustration of the first mode for making friends is illustrated previously. Thus, it is omitted here. Briefly, when the first user A1 and the second user A2 agree to proceed with a friendship process, the system 100 can recommend both the first user A1 and the second user A2 to create their platform identities. Thus, real personal information of the first user A1 and the second user A2 can be protected.

Figure 3:
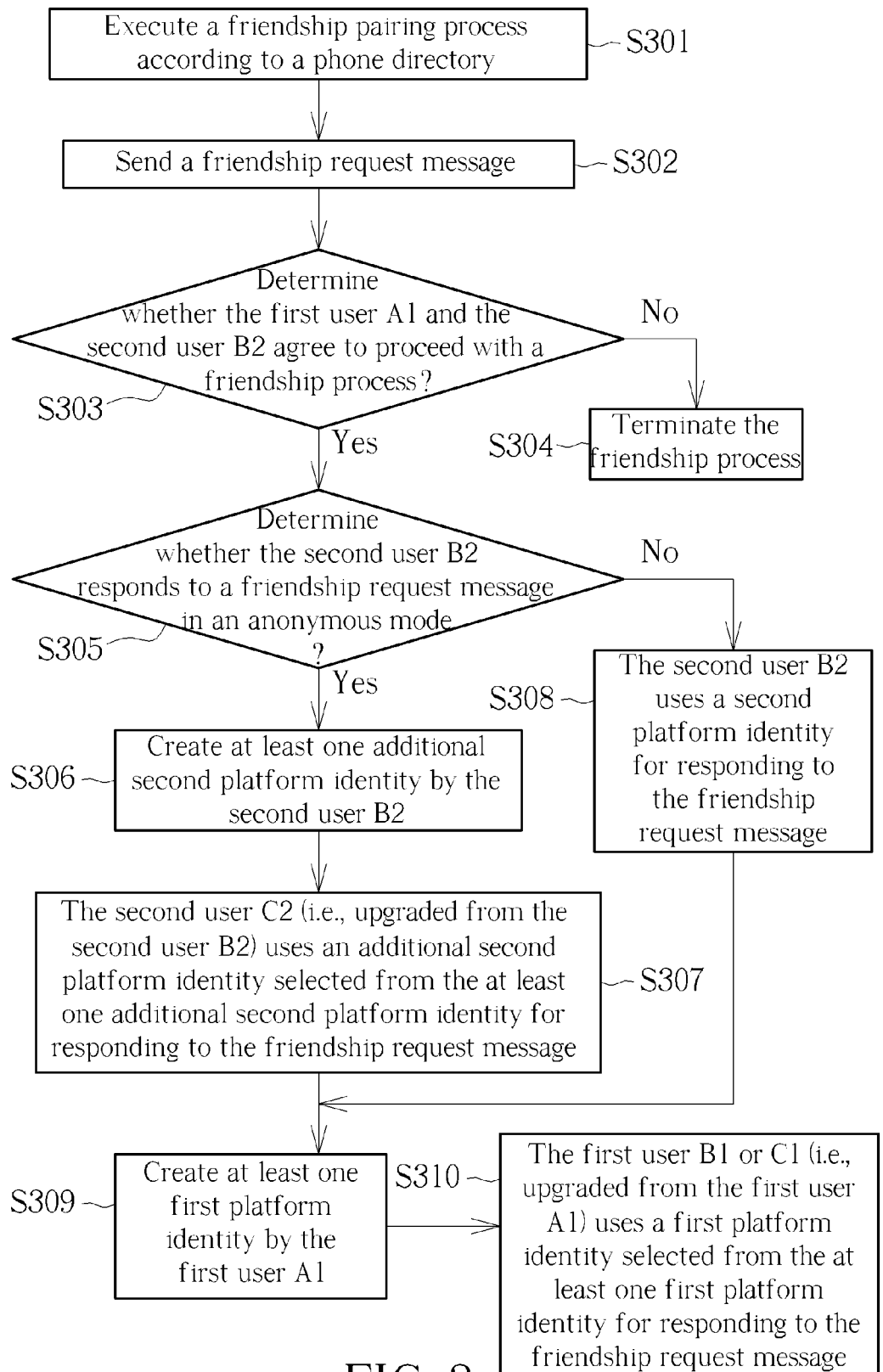
FIG. 3 is flow chart of a second mode for making friends by using the system in FIG. 1.

FIG. 3 is flow chart of a second mode for making friends by using the system 100. The second mode for making friends includes step S301 to step S310, as written below.

step S301: execute a friendship pairing process according to a phone directory;

step S302: send a friendship request message;

step S303: if the first user A1 and the second user B2 agree to proceed with a friendship process, go to step S305, else go to step S304;

step S304: terminate the friendship process.

step S305: if the second user B2 responds to a friendship request message in an anonymous mode, go to step S306, else go to step S308;

step S306: create at least one additional second platform identity by the second user B2;

step S307: the second user C2 (i.e., upgraded from the second user B2) uses an additional second platform identity selected from the at least one additional second platform identity for responding to the friendship request message, and go to step S309;

step S308: the second user B2 uses a second platform identity for responding to the friendship request message;

step S309: create at least one first platform identity by the first user A1;

step S310: the first user B1 or C1 (i.e., upgraded from the first user A1) uses a first platform identity selected from the at least one first platform identity for responding to the friendship request message.

The detail illustration of the second mode for making friends is illustrated previously. Thus, it is omitted here. Briefly, when the first user A1 and the second user B2 agree to proceed with a friendship process, the system 100 can recommend both the first user A1 and the second user A2 to create their platform identities or additional platform identities. However, the second user B2 can optionally use a non-anonymous mode for making friends. Thus, real personal information of the first user A1 and the second user B2 can be protected.

Figure 4:
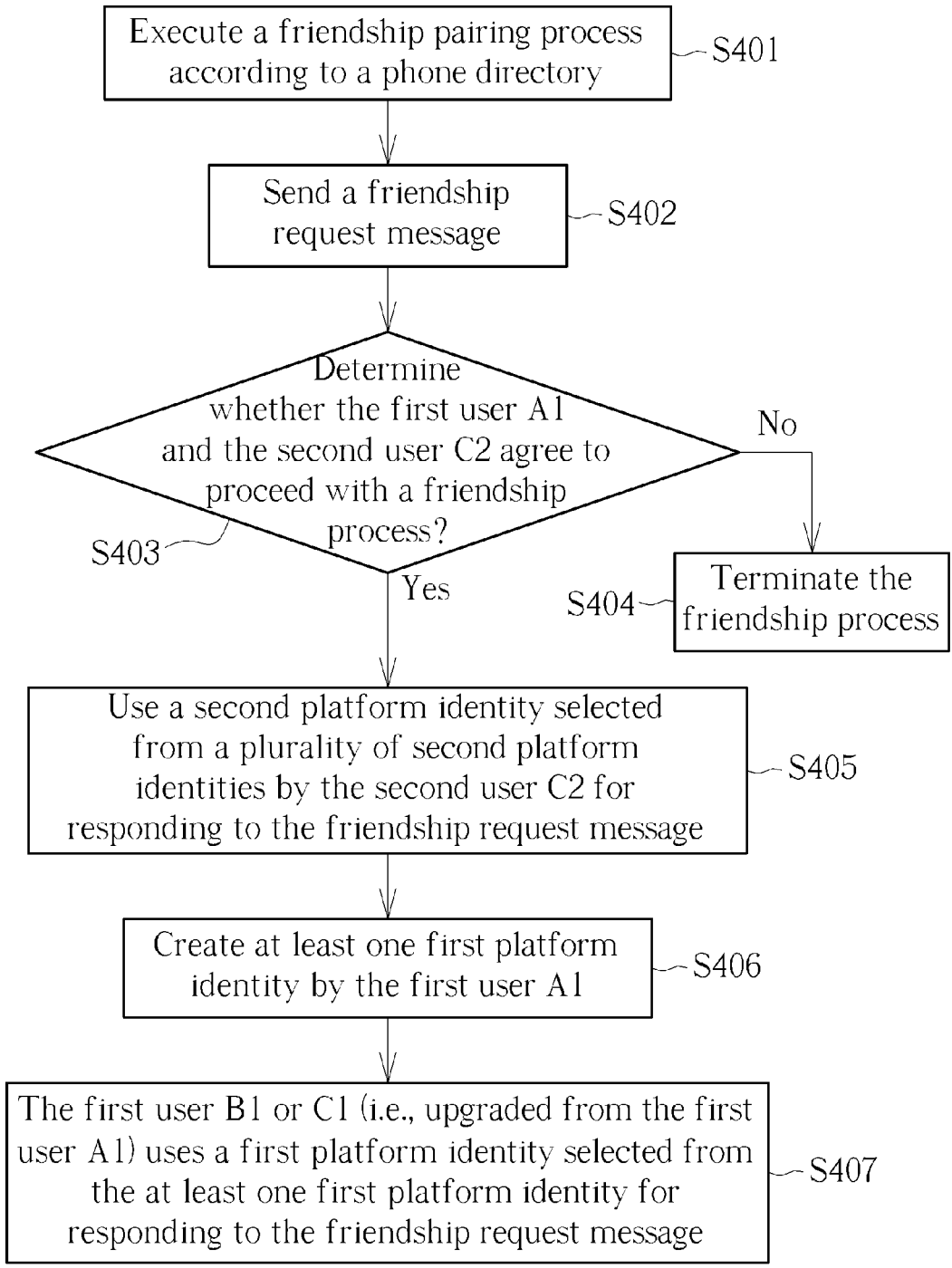
FIG. 4 is flow chart of a third mode for making friends by using the system in FIG. 1.

FIG. 4 is flow chart of a third mode for making friends by using the system 100. The third mode for making friends includes step S401 to step S407, as written below.

step S401: execute a friendship pairing process according to a phone directory;
step S402: send a friendship request message;
step S403: if the first user A1 and the second user C2 agree to proceed with a friendship process, go to step S405, else go to step S404;
step S404: terminate the friendship process.
step S405: use a second platform identity selected from a plurality of second platform identities by the second user C2 for responding to the friendship request message;
step S406: create at least one first platform identity by the first user A1;
step S407: the first user B1 or C1 (i.e., upgraded from the first user A1) uses a first platform identity selected from the at least one first platform identity for responding to the friendship request message.

The detail illustration of the third mode for making friends is illustrated previously. Thus, it is omitted here. Briefly, when the first user A1 and the second user C2 agree to proceed with a friendship process, the system can recommend the first user A1 to create platform identities. Since the second user C2 can select an appropriate platform identity for making friends, real personal information of the first user A1 and the second user C2 can be protected.

Figure 5:
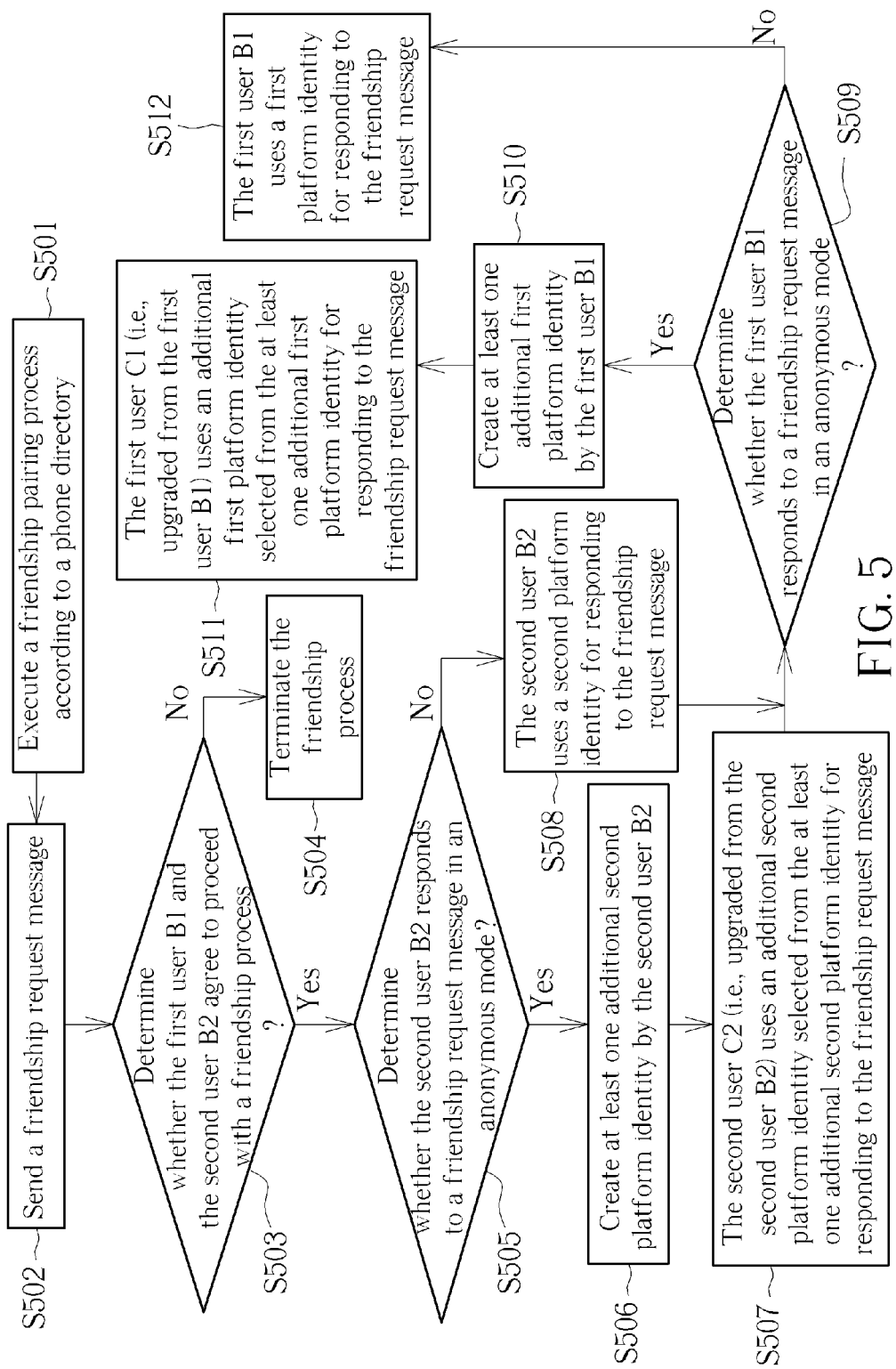
FIG. 5 is flow chart of a fifth mode for making friends by using the system in FIG. 1.

FIG. 5 is flow chart of a fifth mode for making friends by using the system 100. The fifth mode for making friends includes step S501 to step S512, as written below.

step S501: execute a friendship pairing process according to a phone directory;
step S502: send a friendship request message;
step S503: if the first user B1 and the second user B2 agree to proceed with a friendship process, go to step S505, else go to step S504;
step S504: terminate the friendship process.
step S505: if the second user B2 responds to a friendship request message in an anonymous mode, go to step S506, else go to step S508;
step S506: create at least one additional second platform identity by the second user B2;
step S507: the second user C2 (i.e., upgraded from the second user B2) uses an additional second platform identity selected from the at least one additional second platform identity for responding to the friendship request message, and go to step S509;
step S508: the second user B2 uses a second platform identity for responding to the friendship request message;
step S509: if the first user B1 responds to a friendship request message in an anonymous mode, go to step S510, else go to step S512;
step S510: create at least one additional first platform identity by the first user B1;
step S511: the first user C1 (i.e., upgraded from the first user B1) uses an additional first platform identity selected from the at least one additional first platform identity for responding to the friendship request message.
step S512: the first user B1 uses a first platform identity for responding to the friendship request message.

The detail illustration of the fifth mode for making friends is illustrated previously. Thus, it is omitted here. Briefly, when the first user B1 and the second user B2 agree to proceed with a friendship process, the system 100 can recommend both the first user B1 and the second user B2 to create their additional platform identities. However, the first user B1 and/or the second user B2 can optionally use a non-anonymous mode for making friends. Thus, real personal information of the first user B1 and the second user B2 can be protected.

Figure 6:
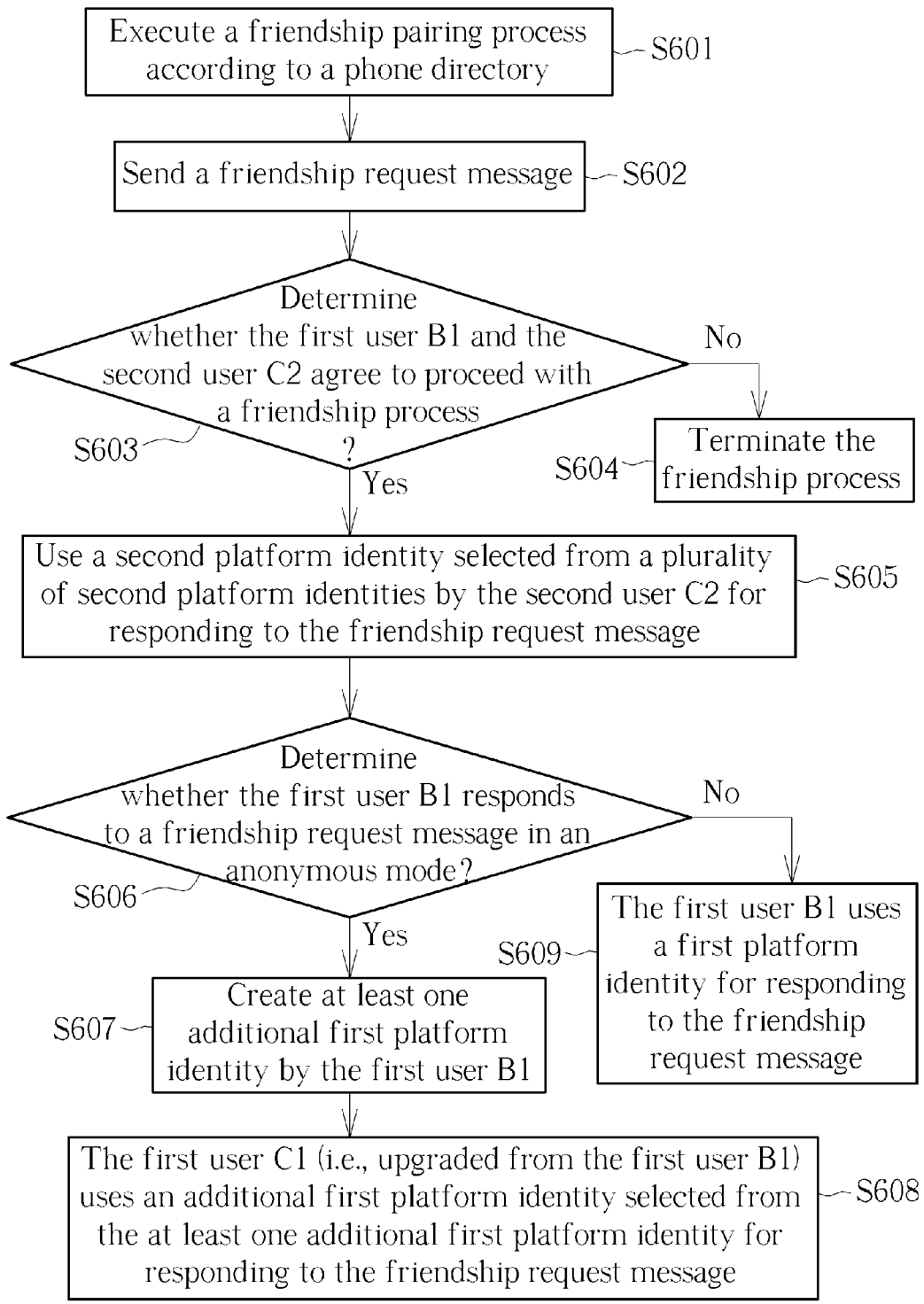
FIG. 6 is flow chart of a sixth mode for making friends by using the system in FIG. 1.

FIG. 6 is flow chart of a sixth mode for making friends by using the system 100. The sixth mode for making friends includes step S601 to step S609, as written below.

step S601: execute a friendship pairing process according to a phone directory;
step S602: send a friendship request message;
step S603: if the first user B1 and the second user C2 agree to proceed with a friendship process, go to step S605, else go to step S604;
step S604: terminate the friendship process.
step S605: use a second platform identity selected from a plurality of second platform identities by the second user C2 for responding to the friendship request message;
step S606: if the first user B1 responds to a friendship request message in an anonymous mode, go to step S607, else go to step S609;
step S607: create at least one additional first platform identity by the first user B1;
step S608: the first user C1 (i.e., upgraded from the first user B1) uses an additional first platform identity selected from the at least one additional first platform identity for responding to the friendship request message.
step S609: the first user B1 uses a first platform identity for responding to the friendship request message.

The detail illustration of the sixth mode for making friends is illustrated previously. Thus, it is omitted here. Briefly, when the first user B1 and the second user C2 agree to proceed with a friendship process, the system 100 can recommend the first user B1 to create additional platform identities. However, the first user B1 can optionally make friends in a non-anonymous mode. Since the second user C2 can select an appropriate platform identity for making friends, real personal information of the first user B1 and the second user C2 can be protected.

Figure 7:
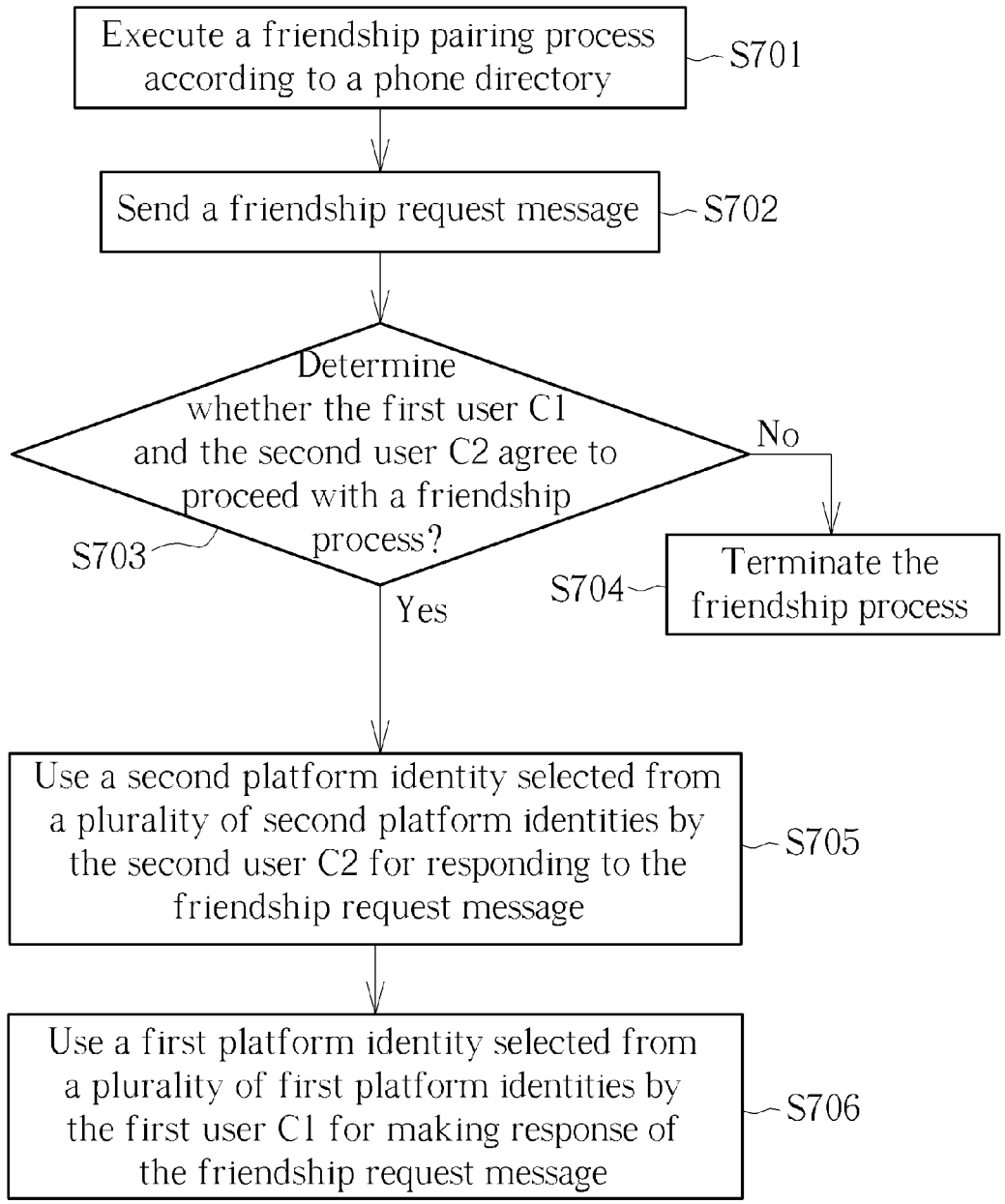
FIG. 7 is flow chart of a ninth mode for making friends by using the system in FIG. 1.

FIG. 7 is flow chart of a ninth mode for making friends by using the system 100. The ninth mode for making friends includes step S701 to step S706, as written below.

step S701: execute a friendship pairing process according to a phone directory;
step S702: send a friendship request message;
step S703: if the first user C1 and the second user C2 agree to proceed with a friendship process, go to step S705, else go to step S704;
step S704: terminate the friendship process.
step S705: use a second platform identity selected from a plurality of second platform identities by the second user C2 for responding to the friendship request message;
step S706: use a first platform identity selected from a plurality of first platform identities by the first user C1 for making response of the friendship request message.

The detail illustration of the ninth mode for making friends is illustrated previously. Thus, it is omitted here. Briefly, after the first user C1 and the second user C2 agree to proceed with a friendship process, the first user C1 and the second user C2 can use their appropriate platform identities for making friends. Thus, real personal information of the first user C1 and the second user C2 can be protected.

Specifically, friendship processes in nine modes previously mentioned can be terminated at any moment. For example, when the first user or the second user rejects the friendship request message before creating at least one platform identity, the friendship process is terminated.

To sum up, the present invention discloses a method for making friends anonymously. The system can recommend the first user and/or the second user to create their platform identities or additional platform identities. Since the platform identities or additional platform identities can be created by using virtual personal information, such as a virtual name, a virtual address, or a virtual profile, By doing so, real personal information or identity can be hidden, increasing security reliability.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for making friends anonymously comprising:
   executing a friendship pairing process by a server between a first user equipment and a second user equipment through a data link according to a phone directory;
   sending a friendship request message from the first user equipment by a first user to the second user equipment controlled by a second user after the friendship pairing process is executed;
   in response to the friendship request message, sending an agreement response from the second user equipment by the second user with a second platform identity selected from at least one second platform identity;
   automatically creating at least one first platform identity by the first user after the friendship request message is sent from the first user equipment and the agreement response is received; and
   the first user using a first platform identity selected from the at least one first platform identity to make friends with the second user;
   wherein the second user has the platform identity, the first user does not have any platform identity before the first user creates the at least one first platform identity, and the first platform identity and the second platform identity are not the real personal identity of the first user and the second user.

2. The method of claim 1, further comprising:
   creating a second platform identity by the second user;
   wherein the platform identity of the second user is the second platform identity, and the second user does not have any platform identity before the second user creates the second platform identity.

3. The method of claim 1, further comprising:
   creating at least one additional second platform identity by the second user under an anonymous mode;
   wherein the platform identity of the second user is an additional second platform identity selected from the at least one additional second platform identity, and the second user has a single platform identity before the second user creates the at least one additional second platform identity.

4. The method of claim 1, wherein the second user has a single platform identity, and the platform identity of the second user is the single platform identity.

5. The method of claim 1, wherein the second user has a plurality of identities, and the platform identity of the second user is selected from the plurality of identities.

6. The method of claim 1, wherein when the first user is not listed in the phone directory of the second user, the friendship request message comprises a telephone number of the first user.

7. The method of claim 1, wherein when the first user is listed in the phone directory of the second user, the friendship request message comprises a nickname of the first user listed in the phone directory.

* * * * *